(12) United States Patent
Lee et al.

(10) Patent No.: US 10,102,196 B2
(45) Date of Patent: Oct. 16, 2018

(54) EXPANDING A SELECTED AREA OF TEXT, ASSOCIATING A DATA LABEL WITH THE EXPANDED AREA OF TEXT, AND STORING THE EXPANDED AREA OF TEXT AND DATA LABEL IN A CLIPBOARD

(71) Applicant: MOTOROLA SOLUTIONS, INC, Chicago, IL (US)

(72) Inventors: Boon Beng Lee, Penang (MY); Chew Yee Kee, Alor Setar (MY); Yei Lan Lee, Penang (MY); Chin Kuan Ong, Penang (MY); Mun Yew Tham, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/345,532

(22) Filed: Nov. 8, 2016

(65) Prior Publication Data
US 2018/0129638 A1 May 10, 2018

(51) Int. Cl.
*G06F 17/24* (2006.01)
*G06F 17/27* (2006.01)
*G06F 3/0482* (2013.01)
*G06F 3/0484* (2013.01)

(52) U.S. Cl.
CPC .......... *G06F 17/276* (2013.01); *G06F 17/243* (2013.01); *G06F 3/0482* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 6,309,305 B1 | 10/2001 | Kraft | |
| 7,797,269 B2 | 9/2010 | Rieman et al. | |
| 9,298,689 B2 | 3/2016 | Chang et al. | |
| 2005/0210401 A1 | 9/2005 | Ketola et al. | |
| 2009/0216911 A1* | 8/2009 | Long | G06F 17/276 710/2 |
| 2011/0125970 A1* | 5/2011 | Commarford | G06F 17/24 711/126 |
| 2011/0126092 A1 | 5/2011 | Harris | |
| 2011/0239110 A1* | 9/2011 | Garrett | G06F 3/0488 715/256 |

(Continued)

*Primary Examiner* — Asher D Kells

(57) ABSTRACT

A method is provided for cutting and pasting text at a computing device. A user selects an area of text on a display of the computing device. The computing device expands the selected area of text to form an expanded area of text to make sure that no text that the user wanted to select is inadvertently omitted. The computing device associates a data label with a portion of the expanded area of text, and the computing device stores the data label and the associated portion of the expanded area of text, preferably within the clipboard of the computing device. When a user enters input text on the computing device, the computing device parses the input text to determine if a data label stored in the clipboard matches the input text. If there is a match, the computing device displays stored text associated with that data label within a popup window, for example. If a user chooses one of the items in the popup window, the data label is replaced by the portion of text that was chosen and matches the data label.

6 Claims, 6 Drawing Sheets

(56) References Cited

U.S. PATENT DOCUMENTS

2014/0215372 A1 7/2014 Reissman et al.
2015/0324342 A1 11/2015 Chin et al.
2016/0196150 A1* 7/2016 Jing ..................... G06F 17/273
　　　　　　　　　　　　　　　　　　　　　715/708

* cited by examiner

| ADDRESS | TIME | DATE | DESCRIPTION |
|---|---|---|---|
| 1423 CAMINO STREET | 2:47 P.M. | OCT. 19, 2016 | SOMEONE STOLE SUNGLASSES FROM A STORE. EARLIER IN THE DAY, SOMEONE STOLE A PURSE FROM INSIDE A STORE IN THAT SAME AREA. |
| 407 WAVERLEY STREET | 1:07 P.M. | OCT. 19, 2016 | SOMEONE STOLE MERCHANDISE FROM A STORE AND THREATENED AN EMPLOYEE. |
| 821 CAMINO STREET | 2:42 P.M. | OCT. 18, 2016 | SOMEONE ATTEMPTED TO FORCIBLY STEAL PROPERTY FROM ANOTHER. |
| 101 PORTAGE AVENUE | 6:48 P.M. | OCT. 18, 2016 | A SHOPLIFTING INCIDENT WAS REPORTED. |

*FIG. 3*

EXPANDING A SELECTED AREA OF TEXT, ASSOCIATING A DATA LABEL WITH THE EXPANDED AREA OF TEXT, AND STORING THE EXPANDED AREA OF TEXT AND DATA LABEL IN A CLIPBOARD

BACKGROUND OF THE INVENTION

In mission critical operations, there is a need to transfer information quickly and accurately. One common way to transfer information is by utilizing the cut and paste feature in a word processor. Cut and paste operation generally copies highlighted text to the clipboard of an electronic device and overwrites whatever text had been previously stored in the clipboard. The user can then place all of the text in the clipboard into a document by executing the paste function.

One limitation of current cut and paste operation is that only one selection of text can be stored at a time in the clipboard of the electronic device. A user can copy a first selection, and then later paste that selection, but once the user copies new text into the clipboard, the previous text is copied over and no longer able to be pasted.

A further limitation is that the user is currently limited to pasting the entire selection of text from the clipboard. If the user wants less than the entire selection currently stored in the clipboard, the user has to paste the entire stored text and then delete any unwanted portions. This is very inconvenient and inefficient.

An additional issue is that a user currently has to precisely highlight the text to copy. Depending on the device, this can be difficult and inexact.

Therefore a need exists for a method that allows a user of an electronic device to quickly and easily copy text and quickly and precisely paste a portion of that copied text to make operations more precise and also significantly more efficient.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

FIG. 3 is a diagram illustrating a table including data labels and associated text in accordance with an exemplary embodiment of the present invention.

Figure 1:
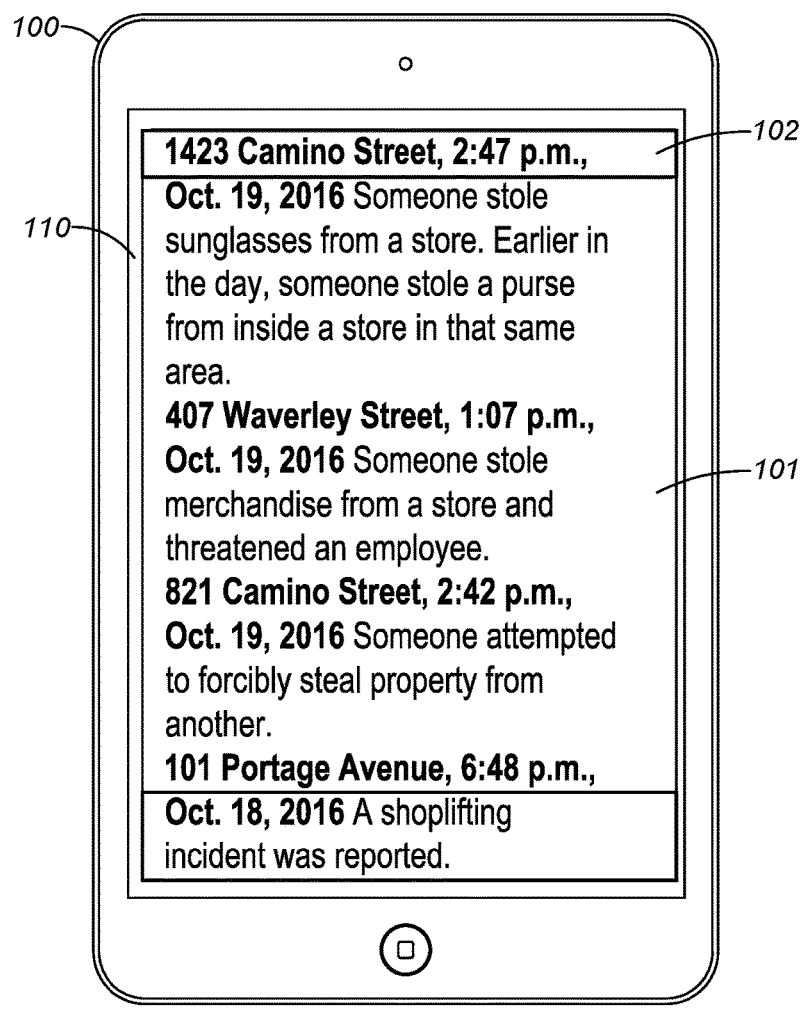
FIG. 1 is a diagram illustrating a computing device for copying text in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is a method of cutting and pasting text on an electronic device. In accordance with an exemplary embodiment of the present invention, the electronic device determines a selected area of text selected by a user. The electronic device expands the selected area of text to form an expanded area of text. The expansion preferably runs as a background process so that the user is unaware that the process is occurring. In an exemplary embodiment, the amount of expansion is inversely proportional to the size of the selected area of text. A data label is associated with a portion of the expanded area of text and stored in the electronic device, preferably in the clipboard.

As a user inputs text into the electronic device, the electronic device is checking to see of any of the data labels are typed by the user. If the electronic device detects a match between typed text and a data label currently stored by the electronic device, the electronic device preferably displays the portion of the expanded area of text, the words or strings associated with the data label, on the electronic device. If the user selects one of the words or strings associated with the data label, the electronic device replaces the matching data label with the portion of the expanded area of text selected.

FIG. 1 is a diagram illustrating a computing device 100 for copying text in accordance with an exemplary embodiment of the present invention. Computing device 100 is an electronic device that preferably allows text entry and cutting and pasting operations. Computing device 100 can be, for example, a laptop computer, a personal computer, a smartphone, a land mobile radio, or any other electronic device that allows for data to be input, copied, and pasted. Computing device 100 includes a screen 110, which is preferably a touch screen that allows for typing and selecting text.

In accordance with an exemplary embodiment as depicted in FIG. 1, a user has highlighted a first portion 101 of the text on the screen of computing device 100. In order to make sure that text that could be important was not missed by the highlight, for example because highlighting on small mobile device screens can be difficult, an exemplary embodiment expands the highlighted area to encompass additional text, as indicated by expanded area of text 102. This is depicted in greater detail in FIG. 4 below.

Figure 2:
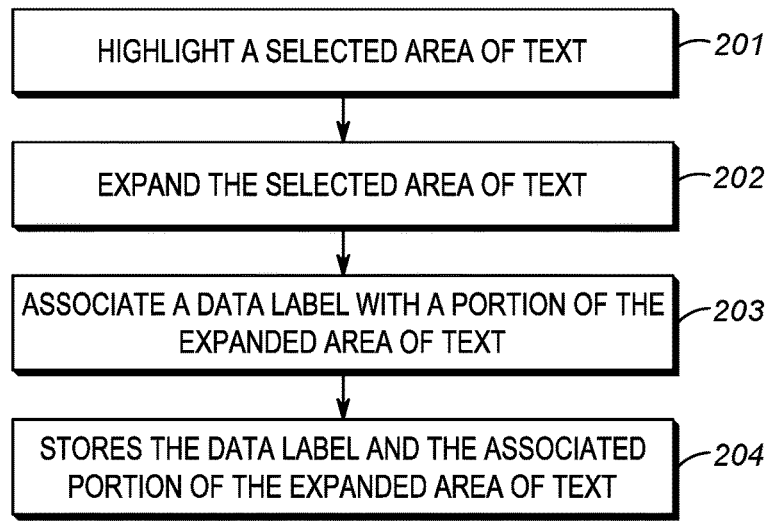
FIG. 2 depicts a flowchart of a method for copying text in accordance with an exemplary embodiment of the present invention.

FIG. 2 depicts a flowchart 200 of a method for copying text in accordance with an exemplary embodiment of the present invention. In accordance with an exemplary embodiment, this process is triggered upon the action of highlighting area of text 101.

A user of a computing device, such as a mobile phone or personal computer, highlights (201) a selected area of text 101.

The computing device expands (202) selected area of text 101 to form an expanded area of text 102. The step of expanding is preferably accomplished as a background process. In accordance with an exemplary embodiment, the step of expanding is accomplished by inversely expanding the selected area of text in proportion to the size of the selected area of text. In an exemplary embodiment, the following expansion formula is used:

$$\% \text{ of Expansion} = 100 \cdot K \left(1 - \frac{\text{Number of Highlighted Characters}}{\text{Number of Characters in user's } FOV}\right)$$

where 0≤K≤1 is preferably a predetermined parameter and one phonetic symbol is counted as one character.

The computing device associates (203) a data label with a portion of the expanded area of text. For example, the computing device scans the highlighted text to look for recognizable patterns, such as names, phone numbers, addresses, email addresses, dates, times, or social media user names. This can be accomplished, for example, using a pattern recognition method in expanded area of text 102. The patterns can be extracted and associated using semantic network classification software.

The computing device stores (204) the data label and the associated portion of the expanded area of text as depicted in FIG. 3. In an exemplary embodiment, the data label and the associated portion of the expanded area of text are stored in the clipboard of computing device 100. This makes the information readily accessible to a user of computing device 100.

FIG. 3 is a diagram illustrating a table 300 including data labels 301 and associated text 302-305 in accordance with an exemplary embodiment of the present invention. A process in accordance with an exemplary embodiment and described at step 203 parsed expanded area of text 102 and detected certain data labels, in this example the address, time, date, and description of criminal events. These data labels are stored, preferably in the clipboard of computing device 100, in data row 301, which is the header field of table 300.

Each row 302-305 of table 300 comprises an associated data record of an event. For example, row 302 includes the address of the event, 1423 Camino Street, the time of the event, 2:47 p.m., the date of the event, Oct. 19, 2016, and a description of the event.

Figure 4:
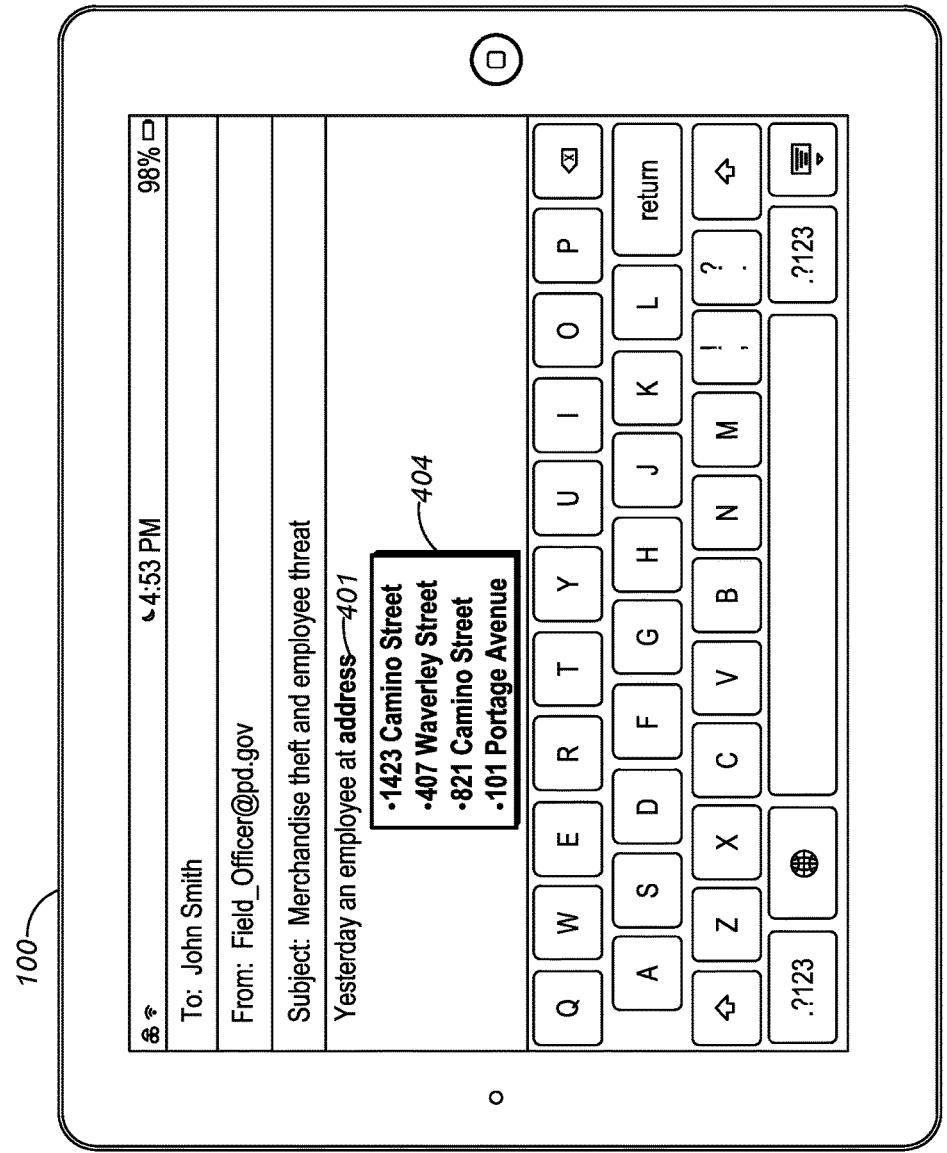
FIG. 4 is a diagram depicting a computing device and a list of paste options in accordance with an exemplary embodiment of the present invention.

FIG. 4 is a diagram 400 depicting computing device 100 and a list of paste options in accordance with an exemplary embodiment of the present invention. Computing device 100 is being used to type an email. As the user types the body of the email, computing device scans the typed words to determine if any of the typed words in the email match data labels stored in table 300.

As shown in this exemplary embodiment, when computing device 100 recognizes one of the data labels 401, in this case the word "address", it retrieves all associated addresses that are currently stored within the clipboard of computing device 100. These addresses are displayed within popup window 404. There can be one or more addresses that appear within popup window 404.

Figure 5:
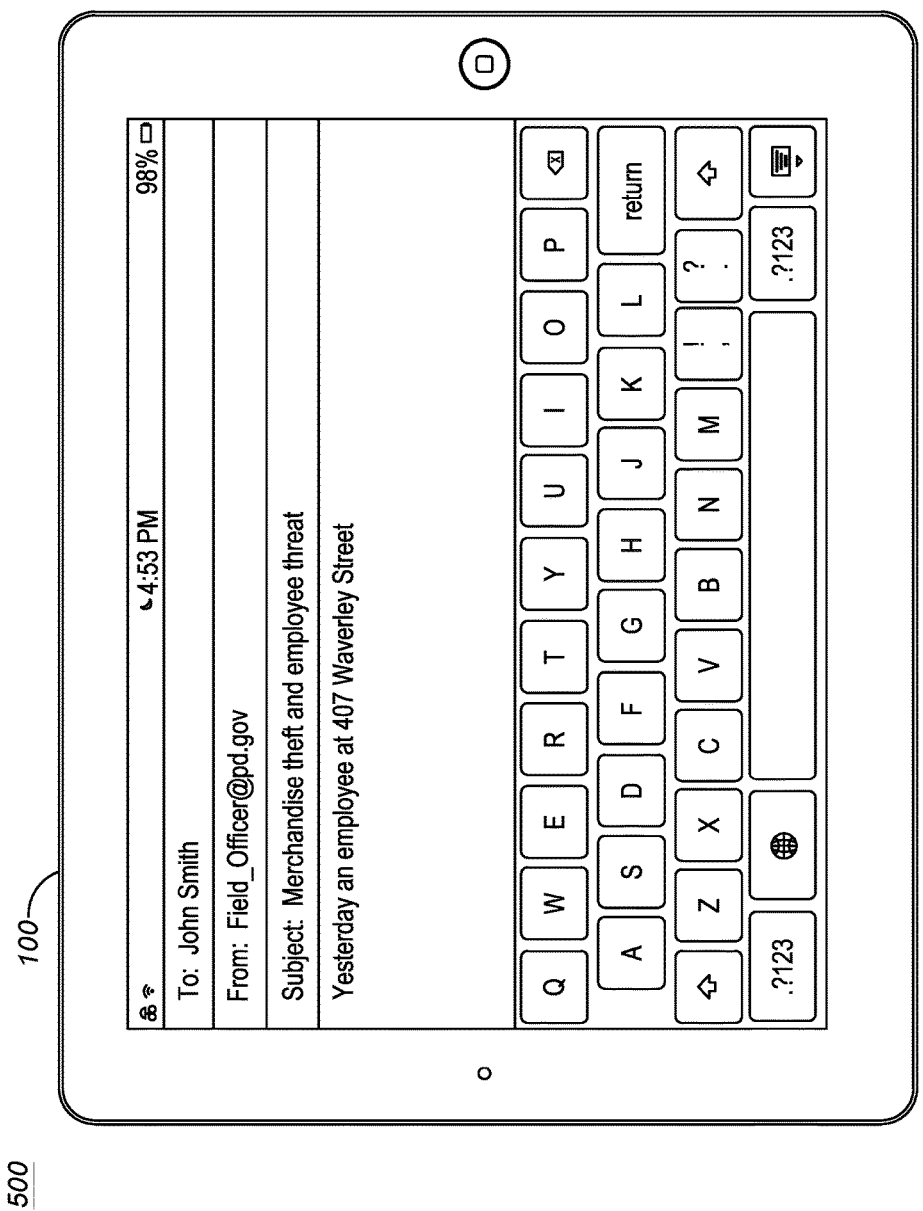
FIG. 5 is a diagram depicting a computing device after replacing a data label with associated text in accordance with an exemplary embodiment of the present invention.

FIG. 5 is a diagram 500 depicting computing device 100 after replacing a data label with associated text in accordance with an exemplary embodiment of the present invention. When a user chooses one of the addresses within popup window 404, the data label, "address", is replaced with the chosen text, "407 Waverley Street." As the user continues to type, computing device 100 continues to scan the types text to determine if any additional data labels are typed and performs the same process to allow the user to replace the data label with a selection chosen from a popup window.

Figure 6:
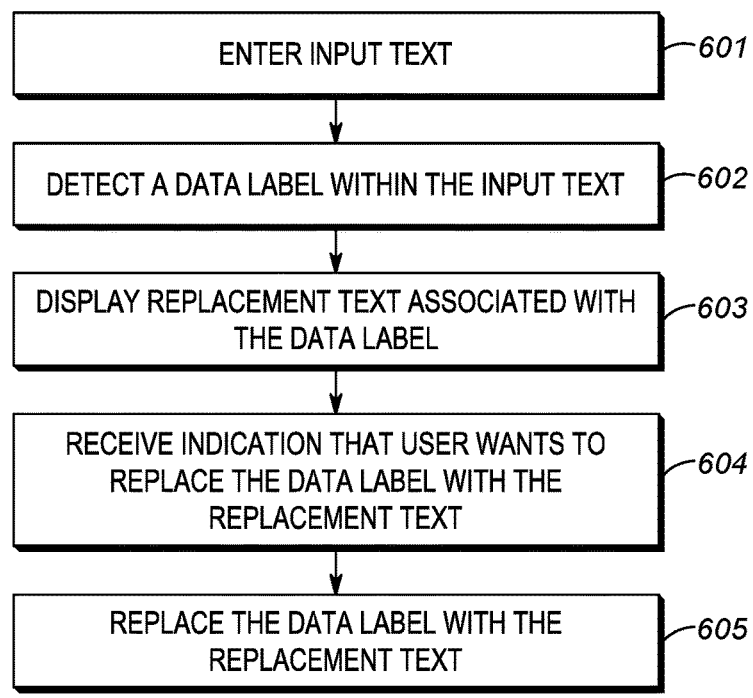
FIG. 6 depicts a flowchart of a method for pasting text in accordance with an exemplary embodiment of the present invention.

FIG. 6 depicts a flowchart 600 of a method for pasting text in accordance with an exemplary embodiment of the present invention.

A user enters (601) input text on an electronic device. As an example, the user could be typing an email message or typing a document.

The electronic device detects (602) a data label within the input text. As the user types, a processor in the electronic device scans the text to determine if any of the typed words or strings match a data label in the text stored in the clipboard of the electronic device. If so, the data label is extracted from the input text.

The electronic device displays (603) replacement text that is associated with the data label. In accordance with an exemplary embodiment, this is accomplished by displaying the replacement text in a suggestion window on the electronic device. As an example, upon detecting a data label within the input text, the electronic device will provide an opportunity for the user to replace the data label with replacement text. There can be a single option of replacement text or multiple possible selections. For example, if there are multiple phone numbers stored in the clipboard, all of them can be displayed, such as in a drop down box.

The electronic device receives (604) an indication that a user wants to replace the data label with the replacement text. This preferably occurs when the user selects replacement text to replace the data label.

The electronic device replaces (605) the data label with the replacement text.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of cutting and pasting text comprising:
determining a selected area of text selected by a user;
expanding the selected area of text to form an expanded area of text;
associating a data label with a portion of the expanded area of text;
storing the data label and the associated portion of the expanded area of text;
entering input text on an electronic device;
detecting a matching data label within the input text, the matching data label matching the data label;
displaying the portion of the expanded area of text;
receiving an indication that a user wants to replace the matching data label with the portion of the expanded area of text; and
replacing the matching data label with the portion of the expanded area of text
wherein the step of storing the data label and the associated portion of the expanded area of text comprises storing the data label and the associated portion of the expanded area of text in a clipboard of a computer.

2. The method of claim 1, wherein the step of expanding the selected area of text comprises expanding the selected area of text as a background process.

3. The method of claim 1, wherein the step of associating a data label with a portion of the expanded area of text comprises determining a pattern in the portion of the expanded area of text using pattern recognition.

4. The method of claim 1, wherein the step of displaying the portion of the expanded area of text comprises displaying the replacement text in a suggestion window on the electronic device.

5. The method of claim 1, wherein the step of detecting the matching data label within the input text comprises extracting the data label from the input text.

6. The method of claim 1, wherein the step of displaying the portion of the expanded area of text comprises displaying a suggestion list of multiple phrases that are associated with the data label.

* * * * *